(12) United States Patent
Somani et al.

(10) Patent No.: US 9,645,834 B2
(45) Date of Patent: May 9, 2017

(54) METHODS FOR REMOTE CONFIGURATION OF SOFTWARE APPLICATIONS (71) Applicant: Good Technology Holdings Limited, Waterloo (CA)

(72) Inventors: Haniff Somani, Mercer Island, WA (US); Sanjiv Maurya, Fremont, CA (US); Sean Michael Quinlan, Duvall, WA (US)

(73) Assignee: Good Technology Holdings Limited, Waterloo, Ontario (CA)

( * ) Notice: Subject to any disclaimer, the term of this patent is extended or adjusted under 35 U.S.C. 154(b) by 434 days.

(21) Appl. No.: 13/745,226

(22) Filed: Jan. 18, 2013

(65) Prior Publication Data
US 2014/0208088 A1 Jul. 24, 2014

(51) Int. Cl.
G06F 9/00 (2006.01)
G06F 9/24 (2006.01)
G06F 9/445 (2006.01)

(52) U.S. Cl.
CPC ................ G06F 9/44505 (2013.01)

(58) Field of Classification Search
CPC ........................................ G06F 8/71
USPC .......................................... 713/100
See application file for complete search history.

(56) References Cited

U.S. PATENT DOCUMENTS

| 5,555,416 A | 9/1996 | Owens et al. |
| 6,064,656 A | 5/2000 | Angal et al. |
| 6,493,871 B1 | 12/2002 | McGuire et al. |
| 2004/0002943 A1 | 1/2004 | Merrill et al. |
| 2005/0262501 A1 | 11/2005 | Marinelli et al. |
| 2007/0044023 A1 | 2/2007 | Carter |
| 2009/0249215 A1* | 10/2009 | Paek .............................. 715/740 |
| 2010/0205284 A1 | 8/2010 | Newton et al. |
| 2010/0242037 A1* | 9/2010 | Xie et al. ....................... 717/178 |
| 2011/0010759 A1* | 1/2011 | Adler ................................. 726/4 |
| 2012/0072895 A1* | 3/2012 | Koyama ................... G06F 8/65 7/168 |
| 2012/0129503 A1 | 5/2012 | Lindeman |
| 2012/0246738 A1 | 9/2012 | Shah et al. |

(Continued)

FOREIGN PATENT DOCUMENTS

WO 2008025514 A1 3/2008

OTHER PUBLICATIONS

Kit Eaton Apple Patent Reveals Restricted Enterprise App Store Plans: Rim, Beware. 2 pages,http://www.fastcompany.com/1717 416/apple-patent-reveals-restricted-enterprise-app- . . . Jan. 14, 2011.

(Continued)

*Primary Examiner* — Robert Cassity
(74) *Attorney, Agent, or Firm* — Fish & Richardson P.C.

(57) ABSTRACT

Methods for remotely configuring application software on a user device are described. The application software defines at least one operating parameter having a set of pre-defined values which change the way the application interacts with the operating system. The operating parameter can be configured remotely and pushed to the user device where it is enforced by the application. Methods for providing information of the operating parameter to a remote device and for updating the configuration of an application are also described.

20 Claims, 4 Drawing Sheets

(56) References Cited

U.S. PATENT DOCUMENTS

2013/0159993 A1\* 6/2013 Misovski .................. G06F 8/61
717/177

OTHER PUBLICATIONS

App Store Volume Purchase Program for Business. Apple Inc. 5 pages, 2011.
Distributing Enterprise Apps for iOS 4 Devices. Apple Inc. 8 pages, Mar. 4, 2011.
iPhone OS Enterprise Deployment Guide. Apple Inc. 90 pages, 2010.
AirWatch. 1 page, http://www.air-watch.com/, 2011.
Information Property List Key Reference. Apple Inc. 72 pages, Jun. 6, 2011.
Eric Chong, et al., "Using the System Installation Tool Kit to Streamline Client Rollout," IBM, Nov. 2001.
International Search Report and Written Opinion of the International Searching Authority Issued Jan. 7, 2013 in PCT/US2012/061040.
International Preliminary Report on Patentability of the International Bureau of WIPO Issued Apr. 22, 2014 in PCT/US2012/061040.
U.S. Appl. No. 13/277,051, filed Oct. 19, 2011, Somani, et al.
"Custom Application Control Policies and How to Use Them", BlackBerry Connection Newsletter—IT Editon, http://www.blackberry.com/newsletters/connection/it/i610/control_policies.shtml, Jun. 1, 2010, 4 pages.
Forum Discussion, Re: App settings from BES?—BlackBerry Support Community Forums, http://supportforums.blackberry.com/t5/BlackBerry-Enterprise-Server/App-settings-fr . . . , Oct. 31, 2011, Mar. 22, 2012 and Mar. 23, 2012 (as indicated), 7 pages.

\* cited by examiner

METHODS FOR REMOTE CONFIGURATION OF SOFTWARE APPLICATIONS

TECHNICAL FIELD

The present invention relates to remote configuration of software applications on user devices. The user devices can be mobile devices.

BACKGROUND

Remote administration of user devices is useful to allow central control over the operation and use of user devices.

Remote administration can be used to control applications on user devices at an operating system level, by restricting access to operating system features and Application Program Interfaces (APIs). For example, Blackberry® Enterprise Server includes "custom application control policies" which are pushed to user devices and then enforced by the operating system. Custom application control policies only have effect on Java applications and are pre-defined in Blackberry® Enterprise Server, they cannot be defined by an application author. As of Nov. 23, 2012, 26 such application policy rules are defined. Examples include whether internal or external network connections are allowed, whether access to specific APIs is allowed (such as the Email API, the Phone API, etc.) and definition of specific domain names that an application can establish a connection to.

SUMMARY

According to a first embodiment, there is provided a method of configuring an application on a user device. The application is configured to interact directly with the operating system via an operating parameter. The operating parameter has a set of possible values, each of which causes the application to interact differently with the operating system. The set of different values is defined by a first entity. The method comprises:

selecting a value for the operating parameter from the set of possible values at a second entity remote from the first entity, wherein the application, the operating parameter and the set of possible values have previously been registered with the second entity; and transmitting the selected value for receipt by the user device for use in configuring the application.

According to another embodiment, there is provided a method of managing the configuration of an application on a user device using a remote device. The method comprises:

receiving, at the remote device, operating parameter information for the application, wherein the operating parameter information includes one or more operating parameters and a set of possible values for each of the one or more operating parameters and wherein each of the set of possible values causes the application to interact differently with an operating system of the user device;

selecting, at the remote device, a value from the set of possible values for at least one of the one or more operating parameters; and transmitting the selected value for receipt by the user device.

According to a further embodiment, there is provided a method of providing operating parameter information for an application on a user device to a remote device using a repository. The method comprises:

receiving, at the repository, operating parameter information associated with the application, wherein the operating parameter information includes one or more operating parameters and a set of possible values for each of the one or more operating parameters, and each of the set of possible values causes the application to interact differently with an operating system of a user device;

transmitting, from the repository, the operating parameter information to the remote device in response to a request from the remote device.

According to another embodiment, there is provided a method of updating the configuration of an application on a user device. The application is configured to interact directly with the operating system via an operating parameter. The operating parameter has a set of possible values, each of which causes the application to interact differently with the operating system. The method comprises:

receiving, at the user device, an updated value of the operating parameter from a remote device;

responsive to receipt of the updated value, generating an event for handling by the application; and responsive to the event, updating the configuration of the application by the application itself according to the updated value.

Further features and advantages of the invention will become apparent from the following description of preferred embodiments of the invention, given by way of example only, which is made with reference to the accompanying drawings.

DETAILED DESCRIPTION

Embodiments provide methods of configuring an application on a user device, methods for managing the configuration of a user device and methods for providing possible configuration settings for an application on a user device to a remote device. Individually these methods relate to different parts of the configuration process; taken together they provide a framework enabling remote administration of an application on a user device.

In one embodiment a method of configuring an application on a user device is provided. The application is configured to interact directly with the operating system via an operating parameter. The operating parameter has a set of possible values, each of which causes the application to interact differently with the operating system. The set of different values is defined by a first entity. The method comprises:

selecting a value for the operating parameter from the set of possible values at a second entity remote from the first entity, wherein the application, the operating parameter and the set of possible values have previously been registered with the second entity; and transmitting the selected value for receipt by the user device for use in configuring the application.

In this embodiment, the possible values for the operating parameter are defined by a first entity but are selected at a second entity remote from the first entity. Thus the operating parameters are not limited to pre-defined rules restricting application functions which are enforced by the operating system, but can be defined by the first entity and enforced at an application level rather than an operating system level. In one embodiment, the first entity may be an application provider (such as an application developer or reseller) and the second entity may a customer of the application provider, for example an enterprise, which desires to control the configuration of the application on user devices. The operating parameter governs interaction of the application with the operating system and so alters application behavior without requiring enforcement by the operating system. The operating parameter can also govern interaction of the application with the user or interaction of the application with the components external to device because these interactions are facilitated by the interaction of the application with the operating system. This allows the first entity to define application specific parameters that can be centrally administered by the second entity to control the operation of the application on a user device. Therefore, unlike prior systems, rules to control application are not limited to those pre-defined and provided by an operating system. The resulting system is more flexible because any aspect of an application's behavior can potentially be controlled, subject to definition of a suitable operating parameter by the first entity.

The operating parameter can have at least one of a data type, a default value and a description in some embodiments. These can be used at the second entity to determine how to display the set of possible values for selection. Further embodiments comprise displaying the operating parameter and set of possible values for selection by a user of the second entity.

In another embodiment, there is provided a method of managing the configuration of an application on a user device using a remote device. The method comprises:

receiving, at the remote device, operating parameter information for the application, wherein the operating parameter information includes one or more operating parameters and a set of possible values for each of the one or more operating parameters and wherein each of the set of possible values causes the application to interact differently with an operating system of the user device;

selecting, at the remote device, a value from the set of possible values for at least one of the one or more operating parameters; and transmitting, from the remote device, the selected value for receipt by the user device.

In this embodiment, the selection of values for operating parameters is improved because information about the parameters is received at the remote device. There is therefore no requirement for additional documentation regarding settings and their allowable or possible values. Furthermore, there is no limitation to sets of pre-defined operating parameters, the application developer has freedom to define whatever operating parameters are required.

In some embodiments the parameter information originates from a first entity, which as described above can be an application provider or an application reseller. The parameters and their values can therefore be defined specific to a particular application by the first entity.

The operating parameter information can include at least one of a data type, a default value and a description of the one or more operating parameters, as described above. This can improve the way they are handled at the remote device for selection.

In some embodiments, more than one application can be managed and these do not need to originate from the same entity. For example, the configuration of a first application and a second application on the user device can be managed. The method can then further comprise receiving, at the remote device, operating parameter information which originates from a first entity for the first application and operating parameter information which originates from a second entity for the second application. The first and second entity need not be the same and the method therefore allows for management of the configuration of applications from different entities. In this case both the first entity and the second entity can be an application provider or an application reseller, so the second entity is not the same as the second entity described above. This can allow a consistent user interface to be presented for managing the configuration of both the first and second applications even though those applications were provided by different developers.

The method can further comprise displaying, at the remote device, the one or more operating parameters and the set of possible values for selection by a user, as described above.

The selected value can be stored in the remote device, for example in non-transitory storage of the remote device. This allows the selected value to be used later for configuring further user devices, or used to restore the configuration to the user device.

The operating parameter can include a version number. In that case, the method can further comprise:

requesting, from a repository, a current version number of the parameter information;

receiving the current version number;

comparing the version number to the current version number received and requesting updated parameter information from the repository if the version number is not the same as the current version number received.

This allows the parameter information to be updated should a new version of the parameter information be stored in the repository.

In another embodiment, there is provided a method of providing operating parameter information for an application on a user device to a remote device using a repository. The method comprises:

receiving, at the repository, operating parameter information associated with the application, wherein the operating parameter information includes one or more operating parameters and a set of possible values for each of the one or more operating parameters, and each of the set of possible values causes the application to interact differently with an operating system of a user device; and transmitting, from the repository, the operating parameter information to the remote device in response to a request from the remote device.

The repository allows operating parameter information to be stored and distributed to remote devices for use in configuration of the application on user devices. For example, the remote device may comprise a control entity or control server as described above.

The parameter information can be stored with an associated version number in non-transitory storage of the repository. The repository can then avoid the transfer of parameter information which is already present on the remote device. The use of a version number enables the remote device to ensure that its operating parameter information is up to date without needing to request the complete operating parameter information.

The method can further comprise:

receiving, at the repository, updated operating parameter information;

incrementing the associated version number to give an incremented version number; and storing the updated operating parameter information with the incremented version number in non-transitory storage of the repository.

The operating parameter information can originate from a first entity, for example an application developer or application reseller, as described above. This allows operating parameter to be uploaded once to a repository by the first entity and then distributed to remote devices by the repository.

The operating parameter information can include at least one of a data type, a default value and a description of the one or more operating parameters, as described above.

In another embodiment, a method of updating the configuration of an application on a user device is provided. The application is configured to interact directly with the operating system via an operating parameter. The operating parameter has a set of possible values, each of which causes the application to interact differently with the operating system. The method comprises:

receiving, at the user device, an updated value of the operating parameter from another device;

responsive to receipt of the updated value, generating an event for handling by the application; and responsive to the event, updating the configuration of the application by the application itself according to the updated value.

This allows the application configuration to be changed remotely and the configuration change to be enforced by the application, rather than the operating system.

In some embodiments the updated value of the operating parameter indicates that a feature of the application is disabled and the updating the configuration by the application includes deleting at least some data or deleting all data associated with the feature which is disabled. This improves data security by removing data relating to disabled features from a user device.

Figure 1:
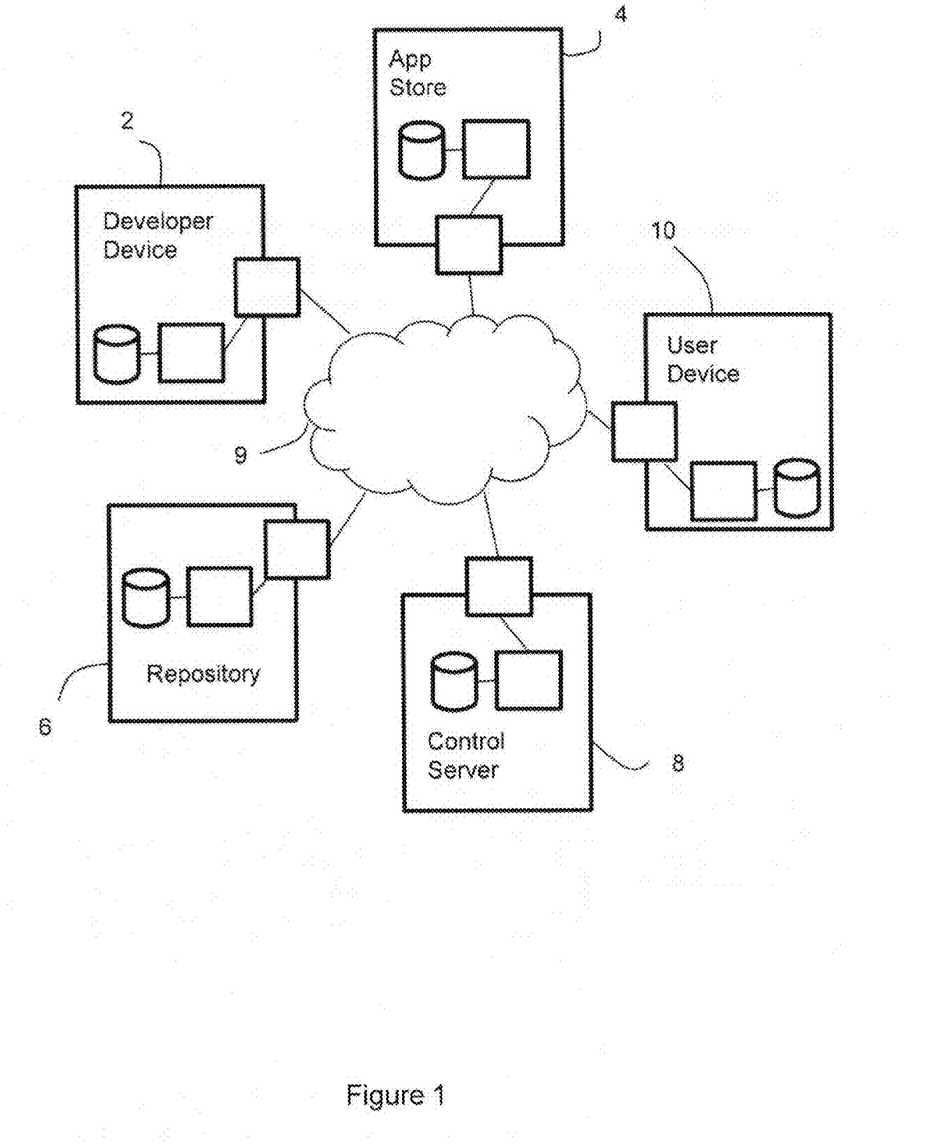
FIG. 1 is a diagrammatic representation of the various components of an application infrastructure within which embodiments of the invention may be practiced.

FIG. 1 is a diagrammatic representation of the various components of an application infrastructure within which embodiments of the invention may be practiced. Together, the components of the infrastructure allow the development and publication of applications by a developer or reseller and the delivery and configuration of those applications on a user device.

The infrastructure depicted in FIG. 1 comprises a developer device 2, application store 4, repository 6, control server 8 and a user device 10 connected by a network 9. Although depicted as a single network in FIG. 1 for clarity, the network 9 may itself comprise a number of interconnected networks.

The Developer Device 2 can be a computing device comprising a processor, non-transitory storage and a network interface. The processor can be configured to run a development environment by following program instructions in the storage. A user can therefore author applications on the developer device 2. Applications authored on the developer device 2 can include configuration options for the application. The configuration options are enforced by the application itself. The configuration options may take the form of one or more operating parameters which can take a defined set of values. Depending on the value of the operating parameter the application changes its interaction with the operating system of the device on which it is running. The operating parameter can also change the interaction of the application with the user or an external system.

The developer device 2 has network connections to an application store 4 and a repository 6. The application store 4 and the repository 6 can both be computing devices comprising a processor, non-transitory storage and a network interface. In some embodiments the functions of the application store 4 and the repository 6 may be provided by a single computing device. When an application is completed on the developer device 2, the program instructions making up the application are uploaded to the application store 4 for download by a user device. In some embodiments there may be a further approval process carried out before the application is made available in the application store 4, for example approval by the owner of the application store 4. In addition, details of the operating parameter(s) for the application and permitted values are uploaded to the repository 6.

The repository 6 also has network connections to a control server 8 and a user device 10. The control server 8 can be a computing device comprising a processor, non-transitory storage and a network interface. The control server 8 communicates with the repository 6 to receive details of operating parameter(s) for applications downloaded from the application store onto the user device 10. It presents a user interface allowing values of the operating parameters to be specified and assigned to one or more user device(s), the control server then pushes the values to the user devices either directly or indirectly (for example via the repository 6).

The user device 10 can be any device capable of running an application provided by the application store 4. The user device 10 contains a processor, non-transitory storage and a network interface. For example the user device 10 may be a computing device, such as a desktop, portable or tablet computer, a mobile telephone or a PDA. In the case that the user device is a mobile telephone, such as a smart phone, the network interface can be a wireless data network interface, including networks according to the IEEE 802.11 standards (sometimes referred to as "WiFi"), IEEE 802.15, IEEE 802.16 (sometimes referred to as "WiMax"), GSM, CDMA, WCDMA, so called "3G", Long Term Evolution, Long Term Evolution-Advanced and other suitable standard. The user device 10 can access and download applications from the application store 4. In some embodiments, applications may be pushed from the application store 4 to the user device 10, for example to update an existing application automatically or to allow remote control over the applications loaded on the user device 10.

The network connections can use any suitable network technology. Although depicted as point-to-point links in FIG. 1 this is for clarity to show data transfer paths in the application infrastructure. The components may communicate over a general network, such as an Ethernet network or the internet with data being routed as appropriate between components. In some embodiments, the control server may be located behind a firewall and communicate over a secure network connection, for example using the HTTPS protocol. Communication between all components in the infrastructure can use secure connections in some components.

The control server 8 allows a user of the control server 8 to control the configuration of operating parameters for applications installed on a user device 10. The user of the control server 8 need not be the same as that of the user device, for example the control server 8 may be operated by an administrator of an enterprise to control the configuration of user devices 10 used to access data of the enterprise, for example by controlling the configuration of an application used to access data which is stored on the user device 10.

An example overview of the process of authoring, deploying and configuring an application on a user device will now system, although it will be appreciated that the invention is not limited to this example and can be applied to any application infrastructure in which remote configuration of applications is required.

During development of an application, the developer defines application specific operating parameters that change the interaction of the application with the operating system when the application is run. As they are defined by the developer, the potential scope for these operating parameters is unlimited. To give an example, the operating parameters may allow or disable access to specific application features. This is not possible with pre-defined rules at the operating system level, which can only restrict access to operating system features or features which are provided outside of the application.

As part of the definition of the operating parameter, the developer also specifies allowable values for the parameter. When the application is run on a user device, these values are then interpreted by the application to alter its behavior.

When development of the application is complete, the developer then defines a data file with information of the operating parameters and their permitted values, for example this can be defined in an xml file. The data file contains information such as the display name for the operating parameter, its type, a list of possible values and a default value. For example, the operating parameters can have the following data types, although in other embodiments fewer or more data types may be provided: Boolean, List (including a definition of the allowable values), Free Text or Hidden text. A Hidden text data type is a textual operating parameter for which only a single fixed value is defined. That value is, therefore, always sent to the user device. The enterprise administrator is offered no option in the UI to select a corresponding value, since only one value is defined. This data type can be useful to allow the application developer to reconfigure all instances of an application, without input from the enterprise administrator, using this "hidden" parameter.

Once created, the data file can be uploaded to the control server 8. This can take place directly or indirectly. For example, if an enterprise has developed an application for its own sole use, the data file can be uploaded directly to the control server 8 of that enterprise. Alternatively, if the application could be used by several enterprises, the data file is uploaded to the repository 6. The control server 8 can be pushed the data file by the repository 6, for example when the owner of the control server 8 purchases the application from the developer. The control server can also request and receive the data file with details of operating parameters from the repository 6.

The control server 8 can then interpret the data file to display the operating parameters and allow them to be configured remotely from the user device itself. For example, the control server 8 may parse an xml file defining the operating parameters and display them to a user for selection.

To give an example, if an application is created which can display tabs for "Personnel", "Press", "Projects" and "Sales", the developer can define operating parameters which control whether which tabs are displayed. Another example of an operating parameter is a retention period for data which might be chosen from a number of options. While table 1 below shows the data for these exemplary operating parameters in table format, the data file defining the operating parameters may have any suitable format, including xml.

TABLE 1

| Internal Variable | Type | Display Text | Allowed Values | Default |
|---|---|---|---|---|
| tabs | Multi-selection list | "Tabs to Display" | Show Personnel, Show Press, Show Projects, Show Sales | Show press and show projects are selected |
| Retain | Single selection List | "Retention Period" | 1 Day, 1 Week, 1 Month, 1 Year | 1 Year |

Figure 2:
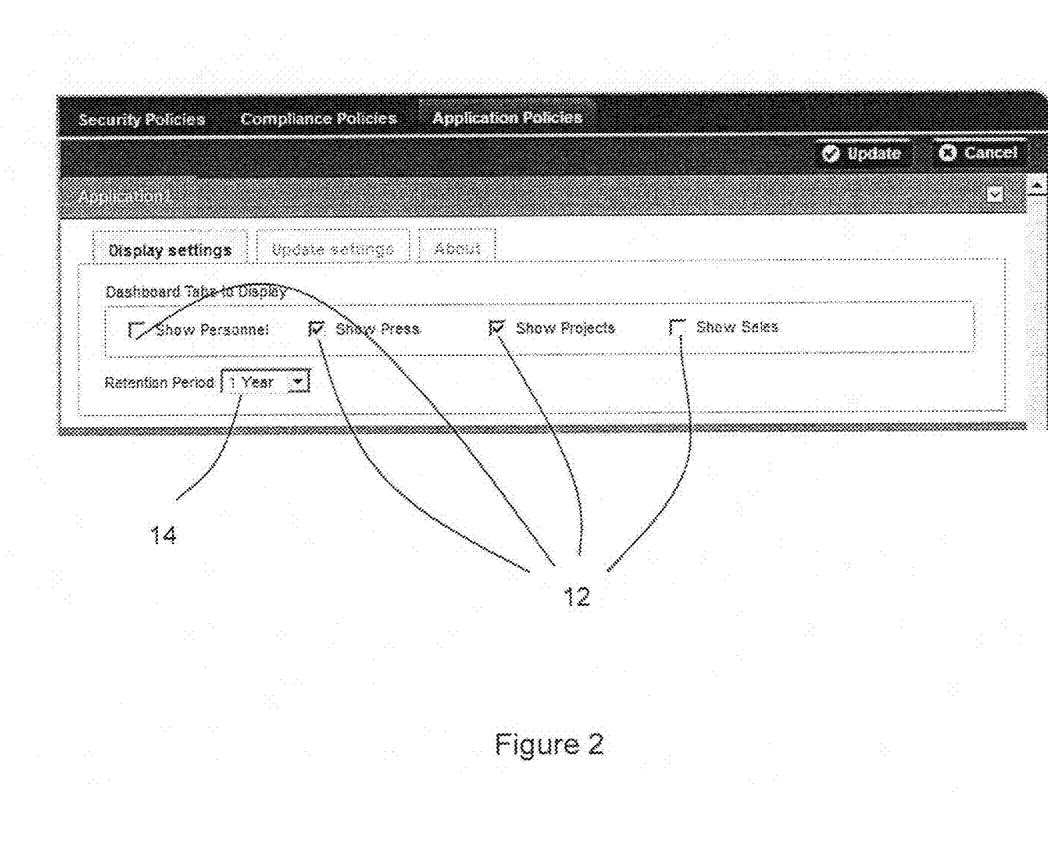
FIG. 2 depicts an example of one way operating parameters can be displayed for selection.

This data is interpreted by the Control server 8 and displayed for selection by a user of the control server 8 to configure the application when it is installed on a user device 10. FIG. 2 depicts an example of one way the operating parameters in Table 1 might be displayed, shown with their default values. The multi-selection list is shown as collection of check boxes 12 contained in a bounding box. The single selection list is shown as a pull down list 14. Other embodiments can include more variable types, which can be displayed in ways appropriate to the data type. For example, a Boolean operating parameter could be displayed as a check box. A Free Text operating parameter could be displayed an editable text box.

The interpretation and display of the operating parameter data by the control server 8 allows a consistent display style to be provided across different applications, regardless of their source. This provides a consistent user experience and allows the configuration of multiple applications from a single system if desired.

The control server allows different users to be given different configurations of the application. A given user is associated with one or more user devices to which the application configuration is pushed. This can be done for each user in turn or at a group level, by assigning a configuration to a group of users. For example, table 2 below illustrates the possible configurations for a number of groups.

TABLE 2 example configuration settings

| Group Name | Notes | Show Personnel | Show Press | Show Projects | Show Sales | Retention Period |
|---|---|---|---|---|---|---|
| Default | Default for all users not in another group | Off | On | On | Off | 1 year |
| HR | Human Resources Staff | On | On | On | Off | 1 year |
| Sales | Sales Staff | Off | On | On | On | 1 year |
| Sales Executive | Executives only | On | On | On | On | 1 month |

It is therefore possible to select which application features are available to which users, or groups of users. The operating parameters are defined by the author of an application and enforced by the application. There is no limitation to specific pre-defined rules defined and enforced by the operating system. While configuration has been discussed in terms of users with associated user devices, in further embodiments the user devices may be configured directly, without considering the user associated with the user device.

The configuration can be pushed to a user device when a user device first registers an application with the repository 6 or the control server 8. For example registration can be required following download from the application store in order to use the application. Configuration of the operating parameters can also be pushed on application startup or whenever a user of the control server alters the permission for one or more users. For example, consider that the settings summarized in Table 2 are modified so that by default the Projects tab is not shown. The Default setting would be amended to set "Show Projects" off, for example by unticking the Show Projects checkbox in FIG. 2. When the change is saved the updated configuration is pushed to all applicable user devices.

When the updated configuration is received by the user device, a "policy change" event is generated and passed to the application to which the configuration applies for handling. The application then updates its configuration as appropriate. For example, in this case the application would stop displaying the projects tab. It is also possible for the application to delete the data associated with any disabled application settings to improve security and save storage on the user device.

Figure 3:
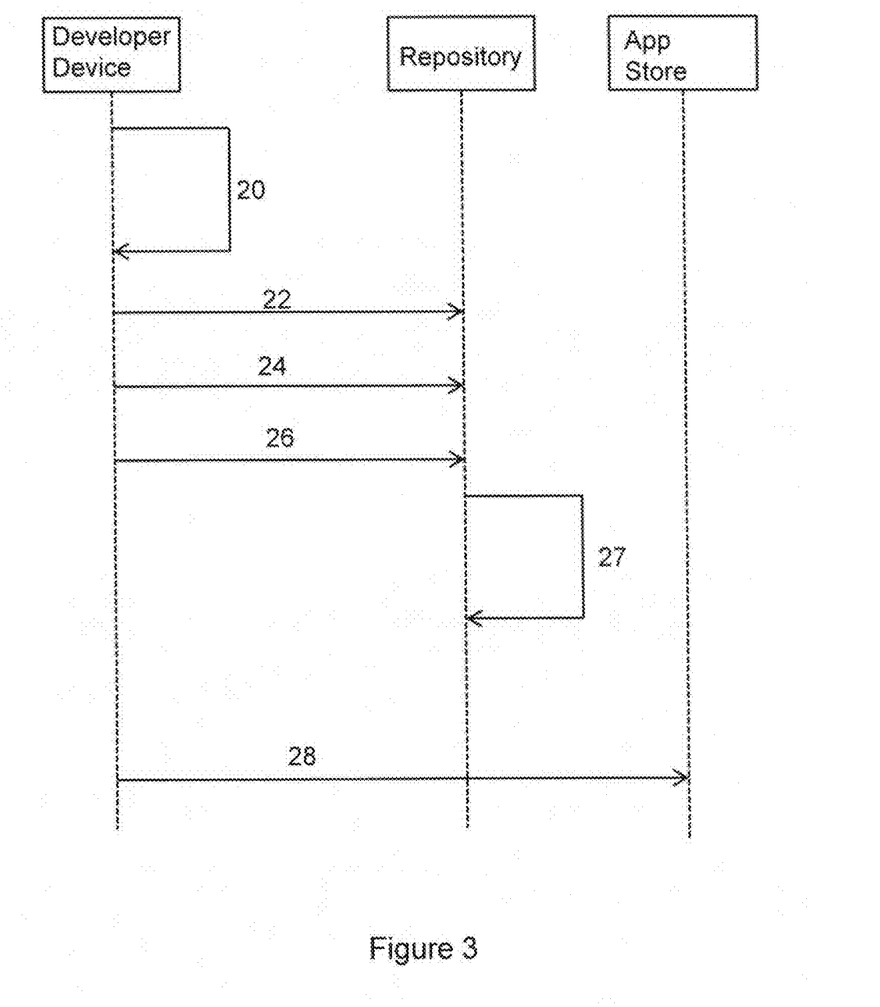
FIG. 3 depicts signal flows in a process of developing and publishing an application and operating parameter information in an embodiment of the invention.

An example process of developing and publishing an application and operating parameter information will now be described with reference to FIG. 3. This process involves the developer device 2, the repository 6 and the application store 4.

First, at step 20, a developer implements an application which includes a behavior controlled by an application-specific policy value or operating parameter. The developer also creates an application-specific data file which contains information of the operating parameter and the values it can take, as well as possible additional information such as a display name, data type and default value.

Once the application is complete, the developer publishes details of the application together with the data file describing operating parameters to the repository 6. The application itself is published to the application store 4. For example, the application data is first published to the repository 6 at step 22. This creates a record representing the application in the repository. The function used to publish the application data to the repository 6 includes information about the application to enhance the record in the repository, for example its description and where it can be purchased from.

Next, at step 24, the developer publishes version information to the repository 6. This provides the repository 6 with information of the latest version of the application (for example version can be 1 for an initial release) and the repository updates the version information it holds for the application.

The data file defining the operating parameters and their allowable values is published to the repository in step 26. On receipt of this file, the repository stores the data file and increments a policy version value for the application at step 27.

Finally, at step 28, the developer publishes the application itself on the application store 4 to be available for download to a user device.

Figure 4:
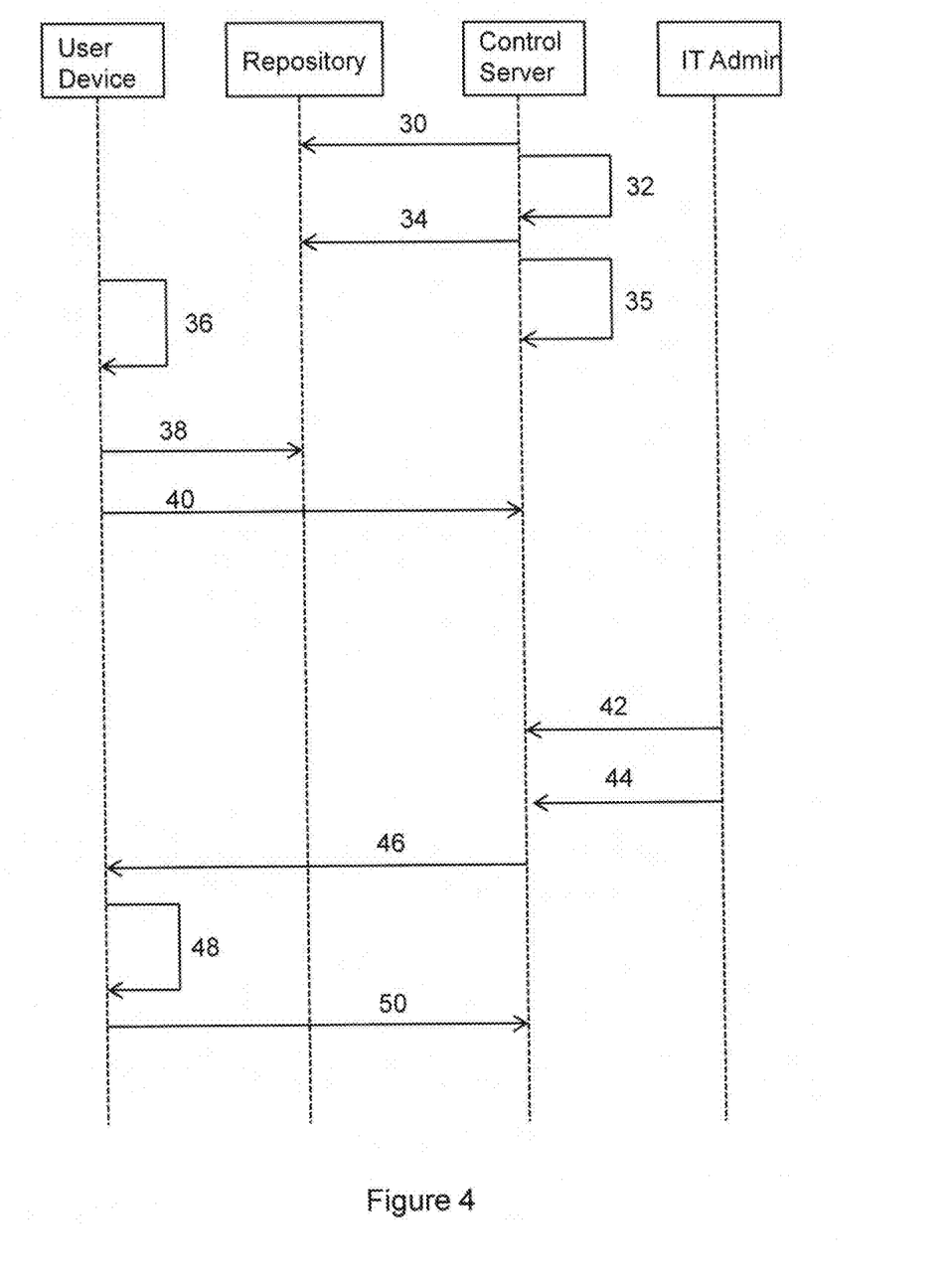
FIG. 4 depicts signal flows in a process of downloading an application to a user device and adjusting the operating parameters of the application remotely.

An example process for remote configuration of an application on a user device 10 using the repository 6 and control server 8 with input from an enterprise administrator 11 at an enterprise whose data is accessed by the application will now be described with reference to FIG. 4. The application has been previously registered with the control server 8, for example the enterprise operating the control server 8 may have previously purchased the application for its user devices and details of the application and configuration file have been pushed from the repository 6 to the control server 8.

As discussed above changes in the configuration data file, sometimes referred to as an application policy, can be pushed automatically to the control server 8 by the repository 6. However, in this embodiment, the control server 8 also checks periodically with the repository 6 for updated versions of the application policy. At step 30, the control server 8 requests an application policy version list from the repository 6. At step 32, the control server 8 then compares the received version list with the versions it had stored. If there are any updated application policies, these are requested at step 34 and then stored in the control server 8 a step 35.

Meanwhile, the application has been downloaded and installed on a user device at step 36. The application is launched and begins an activation process. Activation is a two stage process involving activation of the application with the repository 6 in step 38 and activation of the application with the control server 8 at step 40. For example, activation may occur by entering a code from an email sent to the user of the user device 10.

At this stage, the enterprise administrator 9 has not altered the application configuration from the default. Therefore, following activation, the application operates according to the default configuration. The default configuration is transmitted to the user device 10 for use by the application.

At a point after installation of the application on the user device 10, the enterprise administrator wishes to adjust the configuration of the user device. For example, it may be desired to remove access to the "projects" tab as in the example discussed above. The enterprise administrator logs onto the control server 8 and browses possible application specific configuration settings at step 42. For example, the control server 8 may parse the configuration data file and display options, such as described with reference to FIG. 2 above.

The enterprise administrator makes any changes to the configuration of the operating parameters at step 44. The changed parameters are then pushed to the user device 10 at step 46. For example, this can use a function with an argument of the settings selected by the enterprise administrator. The application receives these settings and stores them at step 48. It generates an event for handling by the application to modify the configuration of the application and responds that the settings have been updated at step 50.

In one embodiment, the application developer can publish a new version of the operating parameter by adding, removing or updating one or more parameters to the repository 6. The control server 8 will then receive this update, for example by being pushed the new version from the repository 6 or by requesting the new version from the repository 6. The new parameters can then be sent to the user's device without any input from the enterprise administrator.

The present invention therefore provides various methods of providing, updating and remotely configuring one or more applications on a user device. The configuration is determined by one or more operating parameters with values specified by the developer of the application. The control of configuration is therefore independent of the operating system and is instead enforced by the application.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method comprising:
   receiving, at a second entity, from a first entity, an operating parameter data file corresponding to an application installed on a plurality of user devices, the application registered at the first entity, wherein the operating parameter data file corresponding to the application defines at least one operating parameter for configuring an application feature internal to the installed application and a plurality of allowable operating parameter values for the operating parameter, wherein the first entity and the second entity are remote from the user device;
   presenting, at the second entity remote from the first entity, at least a portion of the plurality of allowable operating parameter values for the operating parameter from the operating parameter data file corresponding to the application installed on the plurality of user devices;
   selecting, by the second entity, at least one of the allowable operating parameter values from the plurality of allowable operating parameter values presented at the second entity; and
   transmitting, from the second entity to the plurality of user devices, the selected allowable operating parameter value for use in configuring the application feature associated with the installed application, wherein the installed application is operable to interpret the selected operating parameter value and update a configuration of the installed application based on the selected operating parameter value at the plurality of user devices without modification of the underlying installed application;
   wherein each operating parameter value in the plurality of allowable operating parameter values causes the application feature internal to the application to interact differently with operating systems on the plurality of user devices.

2. The method of claim 1, wherein the operating parameter data file further comprises an operating parameter data type, a default operating parameter value, and an operating parameter description for the operating parameter.

3. The method of claim 1, further comprising: displaying the operating parameter and the plurality of allowable operating parameter values associated with the operating parameter for selection by an administrator of the second entity.

4. The method of claim 1, wherein the second entity is a control server configured to control configuration of the plurality of user devices.

5. The method of claim 4, further comprising: displaying the plurality of allowable operating parameter values associated with the operating parameter for selection by an administrator of the control server.

6. The method of claim 4, further comprising: receiving, from at least one of the plurality of user devices, a response indicating that the application has updated an operating parameter value based on the selected operating parameter value.

7. The method of claim 4, further comprising:
   requesting, by the control sever, from the first entity, a current version number associated with the operating parameter data;
   receiving, at the control sever, the current version number associated with the operating parameter data;
   comparing, by the control server, a version number associated with the operating parameter data with the received current version number; and
   requesting, by the control server, updated operating parameter data from the second entity.

8. The method of claim 1, wherein the first entity is one of an application developer or an application data repository.

9. The method of claim 1, wherein the operating parameter data file is created in a pre-determined format by a developer of the installed application.

10. The method of claim 1, wherein the selected operating parameter identifies a configuration allowing or disabling access to at least one specific application feature, and wherein updating the configuration of the installed application comprises allowing or disabling access to the at least one specific application feature by the installed application.

11. A non-transitory, computer-readable medium comprising computer-executable instructions that, when executed by a processor in a computing device, cause the computing device to perform a method comprising:
   receiving, at a second entity, from a first entity, an operating parameter data file corresponding to an application installed on a plurality of user devices, the application registered at the first entity, wherein the operating parameter data file corresponding to the application defines at least one operating parameter for configuring an application feature internal to the installed application and a plurality of allowable operating parameter values for the operating parameter, wherein the first entity and the second entity are remote from the user device;

presenting, at the second entity remote from the first entity, at least a portion of the plurality of allowable operating parameter values for the operating parameter from the operating parameter data file corresponding to the application installed on the plurality of user devices;

selecting, by the second entity, at least one of the allowable operating parameter value from the plurality of allowable operating parameter values presented at the second entity; and transmitting, from the second entity to the plurality of user devices, the selected allowable operating parameter value for use in configuring the application feature associated with the installed application, wherein the installed application is operable to interpret the selected operating parameter value and update a configuration of the installed application based on the selected operating parameter value at the plurality of user devices without modification of the underlying installed application;

wherein allowable operating parameter value in the plurality of allowable operating parameter values causes the application feature internal to the application to interact different with operating systems on the plurality of user devices.

12. The non-transitory, computer-readable medium of claim 11, wherein the operating parameter data file further comprises an operating parameter data type, a default operating parameter value, and an operating parameter description for the operating parameter.

13. The non-transitory, computer-readable medium of claim 11, wherein the method further comprises: displaying the operating parameter and the plurality of allowable operating parameter values associated with the operating parameter for selection by an administrator of the second entity.

14. The non-transitory, computer readable medium of claim 11, wherein the second entity is a control server configured to control configuration of the plurality of user devices.

15. The non-transitory, computer-readable medium of claim 14, wherein the method further comprises: displaying the plurality of allowable operating parameter values associated with the operating parameter for selection by an administrator of the control server.

16. The non-transitory, computer-readable medium of claim 14, wherein the method further comprises: receiving, from at least one of the plurality of user devices, a response indicating that the application has updated an operating parameter value based on the selected operating parameter value.

17. The non-transitory, computer-readable medium of claim 14, wherein the method further comprises:
  requesting, by the control server, from the first entity, a current version number associated with the operating parameter data;
  receiving, at the control server, the current version number associated with the operating parameter data;
  comparing, by the control server, a version number associated with the operating parameter data with the received current version number; and
  requesting, by the control server, updated operating parameter data from the second entity.

18. The non-transitory, computer-readable medium of claim 11, where the first entity is one of an application developer or an application data repository.

19. The non-transitory, computer-readable medium of claim 11, wherein the operating parameter data file is created in a pre-determined format by a developer of the installed application.

20. The non-transitory, computer-readable medium of claim 11, wherein the selected operating parameter identifies a configuration allowing or disabling access to at least one specific application feature, and wherein updating the configuration of the installed application comprises allowing or disabling access to the at least one specific application feature by the installed application.

* * * * *